March 13, 1951 R. H. ANDERSON 2,544,974
ROTATIONAL LIMIT SHAFT COUPLING MECHANISM
Filed May 2, 1949 3 Sheets-Sheet 1
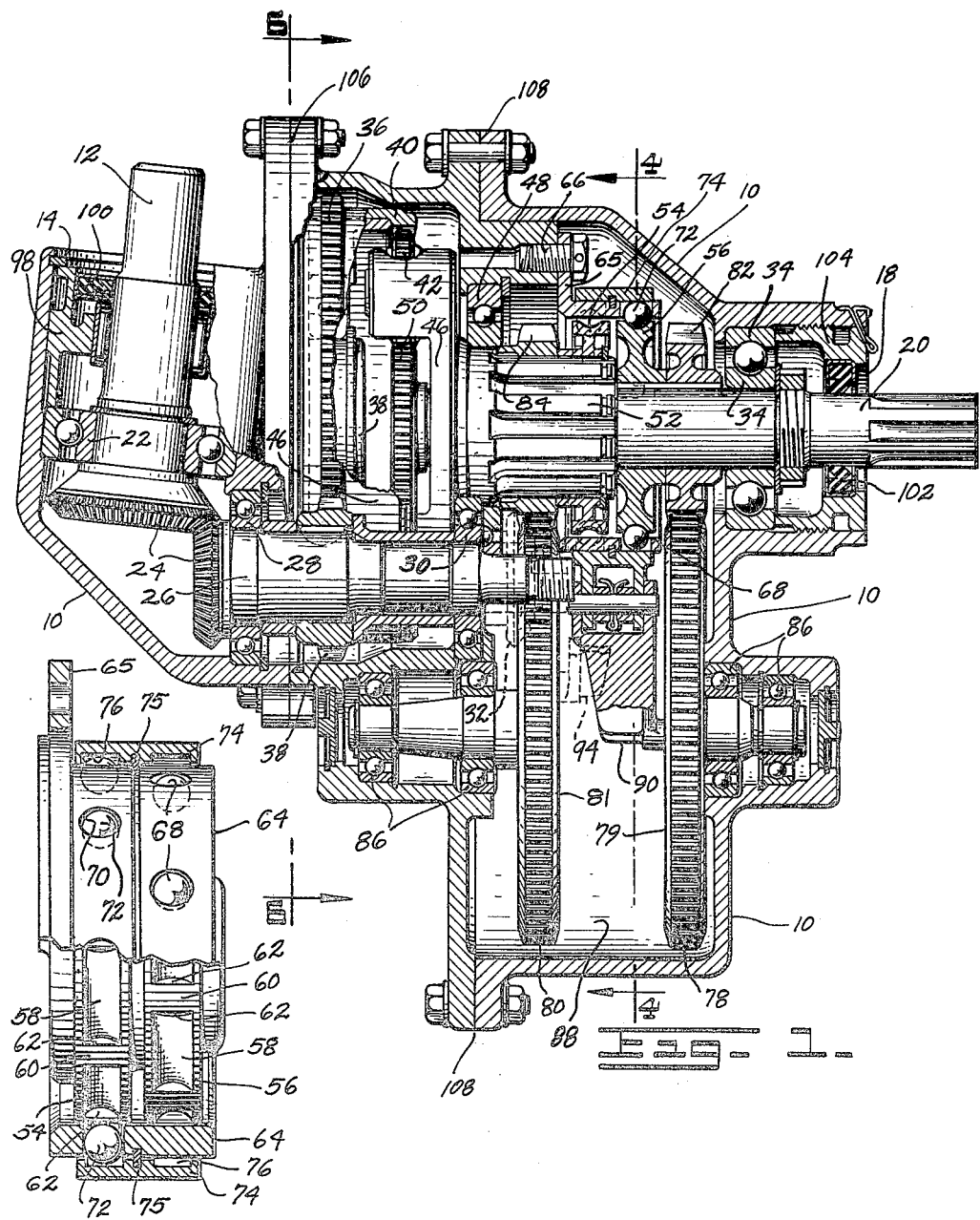
Inventor
ROY H. ANDERSON
REYNOLDS & BEACH - ATTORNEYS
By Robert W. Beach

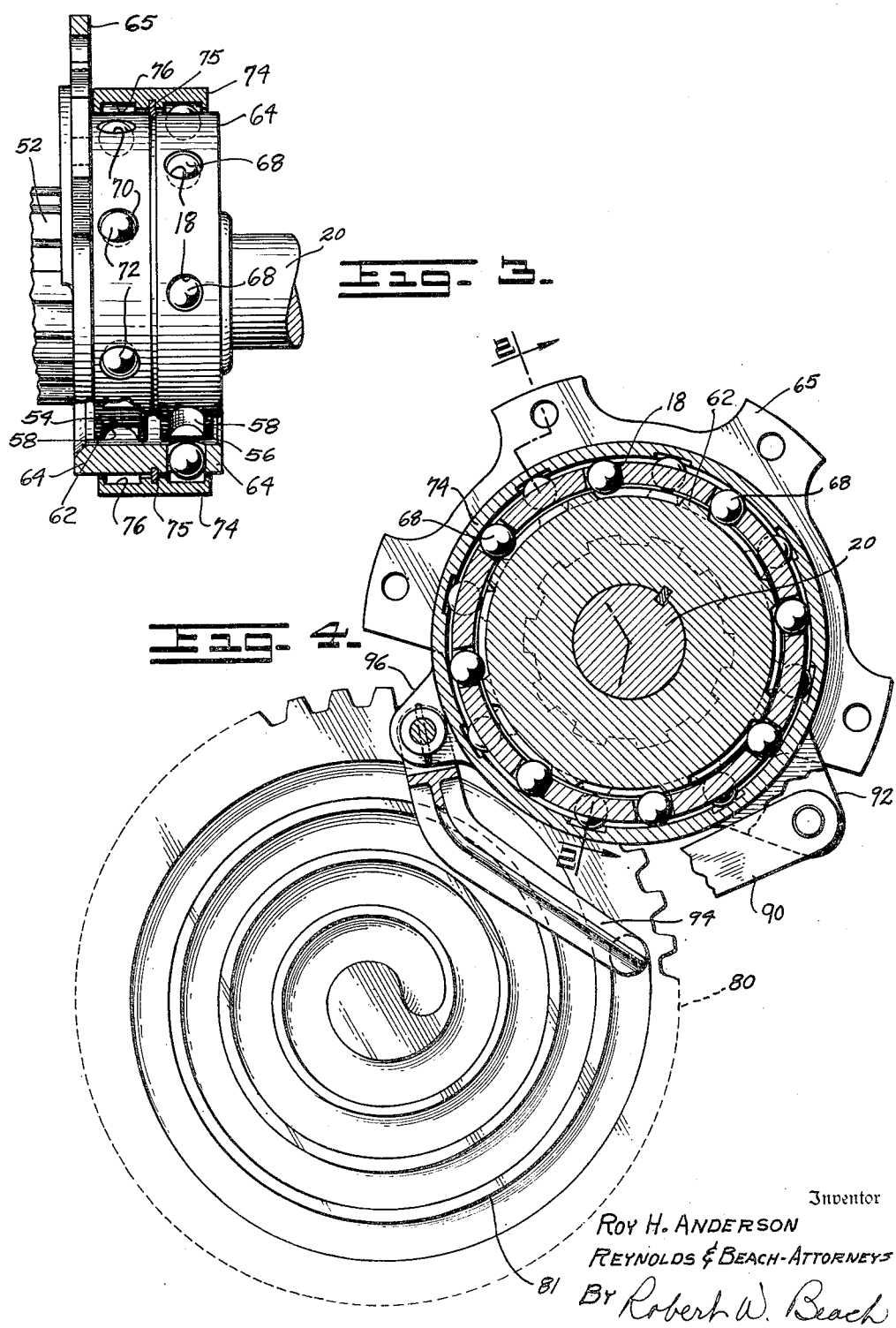

March 13, 1951 R. H. ANDERSON 2,544,974
ROTATIONAL LIMIT SHAFT COUPLING MECHANISM
Filed May 2, 1949 3 Sheets-Sheet 3

Inventor
Roy H. Anderson
Reynolds & Beach-Attorneys
By Robert W. Beach

Patented Mar. 13, 1951

2,544,974

UNITED STATES PATENT OFFICE 2,544,974

ROTATIONAL LIMIT SHAFT COUPLING MECHANISM

Roy H. Anderson, Bellevue, Wash., assignor to Boeing Airplane Company, Seattle, Wash., a corporation of Delaware Application May 2, 1949, Serial No. 90,961

11 Claims. (Cl. 74—762)

This invention concerns rotational limit, shaft coupling mechanism having the characteristic of rotatively coupling a load shaft to a power shaft continuously during rotation of the latter throughout a predetermined fractional portion of its total rotative range, and of disconnecting the load shaft from the power shaft during rotation of the latter throughout the complemental portion of its range. Thus, viewed broadly, the two shafts rotate conjointly as long as rotational displacement of the power shaft is on one side of a selected critical point in its range, irrespective of the direction of rotation, and are rotatively decoupled as long as the power shaft is rotationally displaced to the other side of such limit point, so that then the power shaft can rotate in either direction independently of the load shaft. In the latter instance the load shaft is then locked by my novel mechanism against any rotation.

The mechanism, as herein illustrated, is particularly applicable to the coordinated positioning of aircraft wing control surfaces, particularly a flap and a slat. For instance, it is well known that a flap may be extended to increase the effective lift of a wing. Also it is known that a slat may be opened to reduce the stalling tendency of a wing at high angles of attack. It is therefore evident that an open slat is desirable when the flap is extended into the outer portion of its range to obtain high lift at high angles of attack with minimum risk of a stall occurring, while the action of an open slat is not necessary when the airplane is flying at the comparatively low angles of attack customary when the flap is fully retracted or occupies a position within the inner portion of its range of extension.

The mechanism of this invention is applied effectively to secure this type of control operation by selective coupling and decoupling of a slat drive shaft, viz. the load shaft, from a flap drive shaft, viz. the power shaft. Rotative coupling of the slat drive shaft to the flap drive shaft occurs during all positions of the flap within the inner twenty-five percent of the flap's extension range, to pick a numerical example, and decoupling thereof occurs commencing with and throughout the complemental outer seventy-five percent of such flap extension range, traversed in either direction. When rotatively isolated from the flap drive shaft during these latter periods the slat drive shaft is automatically locked by the limit coupling mechanism, holding the slat steadily open both as against wind forces and despite any flap control adjustments which may be necessary in the outer seventy-five percent of the flap's extension range.

A general object of the invention is to provide rotational limit shaft coupling mechanism of the foregoing type, which is compact and reliable in its operation, so as to meet the unusually stringent requirements of aircraft design. Moreover, so that heavy torque loads on the slat drive shaft may be safely driven or resisted by the mechanism, depending upon whether such shaft is being rotated or is locked, it is desirable that those parts of the mechanism which operatively interengage to couple the slat and flap drive shafts rotatively together and those parts which operatively interengage to lock the slat drive shaft be of rugged, structurally efficient form, making possible lightweight construction, and further that they operate positively in performing their respective functions.

Still another object of the invention is to achieve the described rotational limit coupling function and correlated locking function entirely mechanically and by use of comparatively few and simple mechanism parts capable of prolonged life.

In achieving these and other objects the invention basically comprises differential transmission means separate elements of which are connected respectively to the flap and slat drive shafts, and selective locking means cooperating with such differential transmission means and actuated in response to predetermined rotational displacement from an initial position, of the flap drive shaft. The terms "lock" and "locking" as used herein connote a restraint in the absolute sense, that is against rotation or movement relative to a fixed frame, housing or other fixed part of the mechanism.

The differential transmission means includes an input connection rotated by the flap drive shaft, and two output connections. One such output connection is arranged to rotate the slat drive shaft and the other an independent rotative control element. When the flap shaft is rotatively positioned on one side of a critical coupling point or control position of the mechanism, the control element is locked against rotation, and, on the other side of such point, is released to rotate freely. Locking and release of the two differential outputs is effected alternately or in opposite phase. In order to secure compactness and simplicity of arrangement of the differential transmission elements and the cooperating lock means elements, such differential transmission means herein illustrated comprises a differential gear train of the epicyclic type.

Preferably the mechanism includes concentric shafts, one constituting the slat drive shaft connected to the inner or sun gear of the differential gear train and the other to the rotative spider or planetary gear support of such train. The outer of these concentric shafts terminates short of the inner one; and at adjacent locations upon the respective shafts, are mounted peripherally contoured or ribbed disks comprising separate lock elements for their respective shafts. For locking purposes, the ribbed peripheries of these elements are selectively alternately blocked by sets of balls held in spaced relation around the peripheries of such disks, respectively, by a fixed ball retainer ring having radial ball receiving apertures therein. The retainer ring in turn is encircled by an internally recessed lock control ring operable, by circumferential shifting thereof between control positions, to control the respective ball sets, in turn to effect interlocking of one disk or the other with the ball retainer.

A specific feature of the invention resides in the preferred means, comprising a double-acting cam arrangement, by which the recessed outer ring controlling the ball sets is shifted circumferentially first in one direction and subsequently in the other for reversing the condition of the locking means at the appropriate point during shaft rotation in the operative range of the mechanism.

These and other features, objects and advantages of the invention will become further evident from the following description of the same in its illustrative form, based upon the accompanying drawings.

Figure 1 is a side elevational view of the mechanism, as seen from line 1—1 of Figure 6, with parts broken away to reveal interior details.

Figure 2 is a longitudinal sectional view of a portion of the locking means employed in such mechanism, taken on line 2—2 of Figure 4, shown in one operative position; and Figure 3 is a similar view of the locking means, shown in a different operative position, with the section line rotated through a small angle in order to show the interengagement of lock parts.

Figure 4 is a transverse sectional view showing further details of the locking means, taken on section line 4—4 of Figure 1.

While the rotational limit coupling mechanism of this invention is, of course, not limited in its application to aircraft control operations, a preferred and conveniently illustrated form thereof is that for coordinating the position of an airplane wing slat with that of the wing flap, as mentioned. In such an application, compactness and lightweight construction are essential. Also it is desirable that the mechanism be formed as a single unit which can be readily installed and removed from the aircraft in which it is incorporated. Because of heavy wind forces acting on the flap and slat, while of lightweight construction, it is important that the slat controlling parts of such mechanism be rugged.

Figure 6:
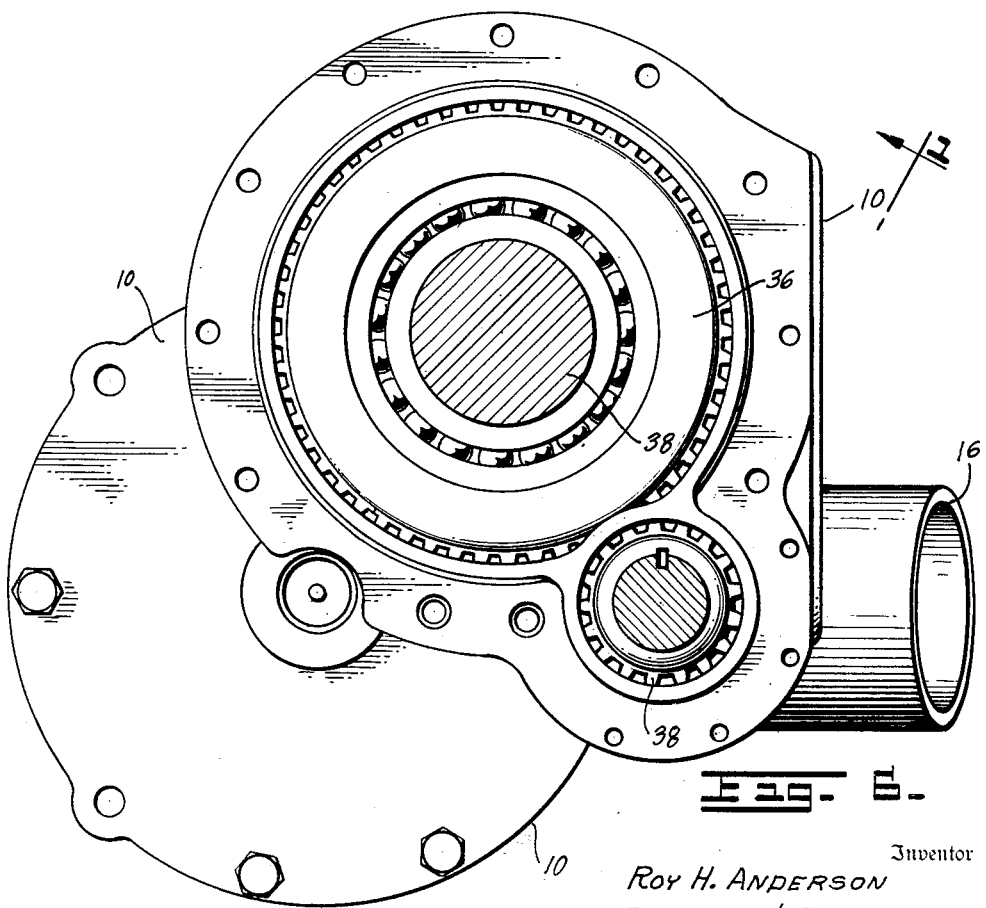
Figure 6 is a transverse sectional view of the coupling mechanism taken on line 6—6 of Figure 1.

As shown in Figures 1 and 6, the mechanism is contained within a housing 10 which, as a matter of convenience in illustration in this case, happens to be of a form designed for installation in a particular type of aircraft and would be mounted fixedly within the wing of same.

The housing 10 has three shaft ports. A power shaft 12, connected to a suitable prime mover (not shown) for supplying power to operate the flap and slat enters the housing through the port 14 at the left in Figure 1. A second port 16 (Figure 6) not appearing in Figure 1, extends generally at right angles to the port 14 and provides a shaft exit for transfer of drive power to wing flap operating mechanism (not shown). Showing of such a shaft is for convenience's sake omitted from Figure 6, and such shaft and port 16 do not appear in Figure 1 because the section plane upon which the view is taken is behind their respective locations in the mechanism. Typically, such a shaft would carry on its outer end outside the mechanism housing 10 a sprocket driving a chain connected to wing flap positioning elements. The third port 18, defined on the right end of housing 10, as seen in Figure 1, extends generally at right angles to both of said ports, 14 and 16. A shaft 20 extends out of the housing through port 18, its function being to control positioning of the wing slat. The axes of the several rotational parts of the rotational limit coupling mechanism about to be described, generally coincide with or are disposed parallel to the axis of shaft 20; the diverse angular relationships therewith of ports 14 and 16 and their respective shafts are, of course, more or less incidental to a particular aircraft installation mechanism design in this illustrative case.

Shaft 12 is journaled by ball bearing 22 in housing 10, and, through bevel gears 24, drives a wing flap control shaft 26 which is herein designated the "flap drive shaft." This shaft is journaled by ball bearing 28 and 30 in housing 10, and carries at its end remote from bevel gears 24 a third bevel gear 32. The latter gear is shown by dotted lines in Figure 1 for convenience in illustration. The power transfer shaft (not shown) to pass through port 16 in order to transfer power to the wing flap positioning mechanism would, if shown, carry a fourth bevel gear meshing with bevel gear 32.

It is to be noted that the transmission of drive power through the mechanism housing to the wing flap or other controlled device is direct, via shafts 12 and 26. The coupling mechanism functions by rotatively connecting and disconnecting the shaft 20, herein referred to as the "slat drive shaft", to flap drive shaft 26 to be rotated conjointly therewith during a predetermined fractional part of the latter's range of rotation. However, at no point in the operation of the mechanism does it interrupt or influence transfer of drive power through it to the flap. Preferably the flap's position is independently controlled by means constituting no part of the present mechanism.

Slat drive shaft 20 is journaled by ball bearing 34 in housing 10 and projects a short distance outside port opening 18. Its projecting end is splined to carry a gear or sprocket (not shown) and thereby form a drive connection to wing slat positioning elements (not shown).

In discussing operation of the mechanism in terms of rotation of shaft 20, shaft 26, and other rotative parts presently to be described, the terms "clockwise" and "counterclockwise," referring to rotation of such parts, will be used to indicate direction of rotation as viewed from the right end of the mechanism as shown in Figure 1, looking along shaft 20 from its outer end.

Attention is now turned to the mechanism by which slat drive shaft 20 is rotatively coupled to flap drive shaft 26 during a predetermined part of the latter's rotative range, and during the complemental part thereof is both effectively decoupled therefrom and locked positively against any rotation, to control positioning of the wing slat as a function of wing flap position. Essentially, such mechanism includes differential transmission means having an input rotatively connected to flap drive shaft 26, and two outputs, alternately locked and released to rotate, one such output being connected to rotate slat drive shaft 20, and further comprising special locking means arranged when actuated to effect such alternate locking and releasing of the differential outputs.

The differential transmission means is preferably of the epicyclic or planetary gear train type. Its input includes a large-diameter spur gear 36 meshed with a drive pinion 38 keyed on flap drive shaft 26. The hub of spur gear 36 is journaled on a stub shaft 38 supported by the end wall of housing 10 coaxial with and opposite the inner end of slat drive shaft 20. This gear carries an annular axially projecting flange 40, the projecting end of which is formed as an internal ring gear. It will be helpful to bear in mind that ring gear 40 rotates conjointly at all times with flap drive shaft 26, in a direction depending upon the latter's direction of rotation.

Figure 5:
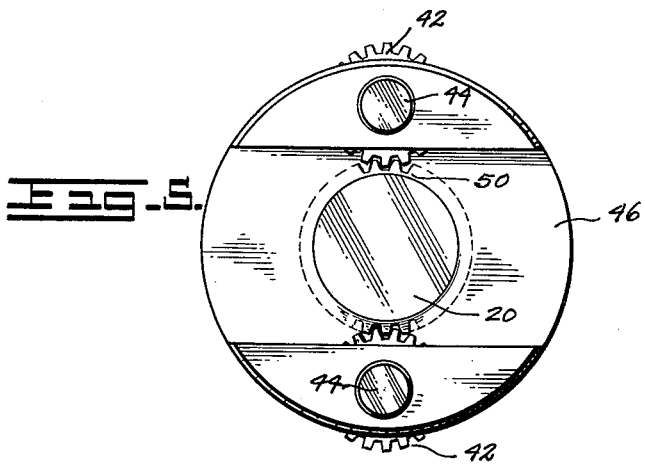
Figure 5 is a detail view of parts of the differential transmission gearing employed in the coupling mechanism.

The differential transmission gearing further includes two oppositely disposed planetary gears 42 (Figures 1 and 5) meshed alike with ring gear 40. These epicyclic or planetary gears are journaled to rotate on shafts 44 carried for orbital movement about the common axis of gear 40 and shaft 20, by opposite arms of a rotative spider 46. The hub of this spider is journaled by ball bearing 48 to rotate about this axis and is centrally apertured throughout its length to pass the inner end of slat shaft 20. The latter in turn carries the sun gear 50, by which it is rotated. Sun gear 50 meshes with epicyclic gears 42 which in turn mesh with internal ring gear 40.

In the usual manner of epicyclic gear train operation, if the sun gear is locked against rotation then the effect of rotating the ring gear is to roll the planetary gears orbitally around the sun gear, and thereby turn the spider. The spider rotates at a rate determined by the relative diameters of the planetary gears and the sun gear, but always less than the rate of rotation of the ring gear. On the other hand, if the spider is locked against rotation so that the planetary gears merely function as idlers, then the sun gear will be rotated with rotation of ring gear 40, likewise at a rate dependent upon the relative diameters of the planetary gears and the sun gear. In this case the sun gear would always rotate at a rate which is faster than that of the ring gear.

In effect, slat drive shaft 20 connected to sun gear 50 constitutes one output of the differential transmission means, locking of which output will force rotation of the other differential output when the input of such differential transmission means is driven by flap drive shaft 26. Such other output of the differential transmission means effectively consists in the spider 46 and the splined annular hub or flange 52 thereon projecting axially to encircle shaft 20 as shown in Figure 1. This flange constitutes a hollow shaft, concentric with shaft 20 and terminating short of the latter's end, well within housing 10. In either condition of operation of the rotational limit coupling mechanism, viz., spider locked or sun gear locked, the differential transmission operates the same in either direction of rotation.

The mechanism further includes special locking means cooperating selectively with the individual differential outputs, namely with hollow shaft 52 and slat drive shaft 20, respectively, to lock one or the other of such shafts against rotation, in accordance with automatic control means subsequently to be described. As shown in Figure 1, an annular wheel or disk-like lock element 54, internally splined, encircles complementally splined hollow shaft 52 for conjoint rotation therewith. This disk is located preferably near such shaft's projecting end, and is retained thereon by suitable circumferential key means as shown in the drawing. A similar disk-like lock element 56, which is preferably of an outside diameter equal to that of lock element 54 and generally similar thereto, encircles shaft 20 and is keyed thereon for rotation conjointly with such shaft. This latter lock element is located on shaft 20 immediately adjacent to the projecting end of shaft 52, next to element 54. Since the shafts 52 and 20 are normally relatively rotatable, the adjacently disposed elements 54 and 56 are likewise normally relatively rotatable. Although one is locked the other may still rotate freely through action of the differential gearing.

Moreover, because of their interconnection through differential gearing, locking of one or the other of these disk-like lock elements causes the one unlocked and its supporting shaft to be rotated conjointly with and by flap drive shaft 26. In order to lock them, the peripheries of these elements, as shown in Figures 2 and 4, are circumferentially grooved in interrupted manner, to form segmental grooves of equal length at regular intervals around their circumference. In the illustrated case, each such lock element has, in all, eight such arcuate grooves 58 extending in spaced succession around its periphery, although the number of grooves may vary in different cases. Successively adjacent grooves are separated by transverse ribs or ungrooved abutment portions 60 having circumferentially spaced groove end walls or abutment shoulders 62. It will be evident subsequently that these lock elements could be otherwise constructed in order to form circumferentially engageable abutments.

Radially apertured at regular circumferential intervals corresponding to the interval of grooves 58, a single ball-retainer ring 64 closely encircles both of the disk-like elements 54 and 56. This ring carries a radial-outward flange 65 by which it is fixedly anchored, as by bolts 66, to the housing 10, so that it can not in any way rotate or shift out of position encircling both lock elements 54 and 56. The sixteen radial apertures in ring 64, corresponding in circumferential spacing to grooves 58, are formed in two groups, one group 18 lying in coplanar registry with the series of grooves in the periphery of disk 56, and the other group of apertures 70 similarly in coplanar registry with the succession of grooves extending around the periphery of disk 54. A locking ball 72 is received in each aperture of both groups of apertures and is of a size, relative to aperture diameter, that it may shift radially inward and outward in its aperture although it may not move appreciably in a circumferential or transverse direction therein. These balls can project from their respective apertures radially inward into the corresponding grooves 58, and, when permitted to do so, can move entirely out of such grooves and ride over the ribs 60 between grooves as the disk rotates.

When, as shown in Figure 1, the balls 72 of one set do project into grooves 58, such as in the periphery of disk 56, they may be forcibly held in that position by ball-controlling outer ring 74 closely encircling ball retainer ring 64, radially outward movement of each such ball in its aperture being prevented because the aperture's outer open end is blocked by ring 74. Under these conditions disk 56 will be locked against rotation in either direction. Rotation is then prevented by a groove end wall or abutment 62, at one end of the groove or the other, depending upon whether attempted rotation is clockwise or counterclockwise, lodging against a ball forcibly held in such groove by ring 74. Any suitable form of lock element equivalent to these disks providing abutments thus circumferentially blocked by the balls to lock the element against rotation could be employed in lieu of the disks.

As mentioned, the outer ring 74 overlies both circumferential groups of retainer ring ball apertures 68 so that the same ring may be employed to block either set of ball apertures, hence lock disk 54 or 56 in the manner just described. However, its inner wall at circumferential intervals corresponding to the ball spacing is recessed to receive all the balls of a set at one time, so that in operation only one set of ball apertures will be blocked at one time, as shown in Figure 1, for a given position of ring 74. The ring 74 has two axially spaced circumferential groups of such ball receiving recesses 76 lying respectively in coplanar registry with the groups of ball apertures in ring 74 with which they cooperate. In order that locking of the disk-like lock elements 54 and 56 by the balls may occur alternately and not simultaneously the circumferential location of the recesses in one group relative to those in the other group, by reference to the corresponding relative circumferential locations of the two cooperating groups of ball apertures, is established in such manner that when one group of recesses lies in circumferential registry with the cooperating group of ball apertures, the other group of recesses and corresponding ball apertures will be out of circumferential registry.

Circumferential shifting of recessed ring 74 about ball retainer ring 64 reverses the existing locking condition of the balls with the lock element peripheries, so that the previously unregistered recesses and ball apertures become registered, and those previously registered become deregistered each time the ring is shifted a specified amount. In one position of recessed ring 74, the balls 72 of the set which then lie in circumferential registry with their corresponding ring recesses 76 are permitted to move radially outward in their respective retainer ring apertures and into such recesses. Then, during rotation of the lock element or disk, 54 or 56, corresponding to this ball set, as one of these balls is contacted by a moving groove end wall or shoulder 62 that ball is wedged radially outward in its retainer ring aperture and into the aligned recess in ring 74 so that such shoulder can move freely past the ball and rotation of that disk will continue uninterrupted. The shaft upon which such disk is mounted can then rotate freely in this position of ring 74.

At the same time, however, the other disk will be locked against rotation because its set of balls will then be held in the disk grooves by unrecessed wall portions of ring 74 occupying the position indicated previously, blocking the ball apertures.

Figure 2 illustrates the operating condition of the lock means in which disk 56 is locked against rotation while disk 54, its cooperating locking balls and recesses lying in registry, is free to rotate. Figure 3 illustrates the converse operating condition wherein disk 54 is locked and disk 56 is free to rotate.

It will by now be evident that simply by circumferential shifting of recessed outer ring 74 by an appropriate amount either of shaft 20 or 52, to which the respective lock means disk elements 56 and 54 are secured, may be locked against rotation in either direction while the other shaft is free to rotate. The amount of shift required to reverse the locking condition just mentioned is dependent upon the effective circumferential offset of one group of outer ring recesses and cooperating ball apertures with respect to the other group of recesses and apertures, cooperating with the different disks, 54, 56, respectively. In this regard, it is immaterial whether the ball aperture groups are circumferentially offset or displaced, one to another, respectively, while the responsive groups of outer ring recesses 76 are axially aligned, or conversely, whether the recess groups are themselves relatively offset and the aperture groups axially aligned, or still again whether some of either offset factor is present in the design of the lock means. As shown herein, the ring recesses are axially aligned and the ball apertures staggered.

It is important to note that the locking action of the balls is positive. Moreover, the shiftable ring 74 by which they are controlled is itself not subject to reactive forces from the balls or the disks which would tend to move it out of one locking condition or the other in which it is set at a particular time. This is true since only forces which are radial can be applied to the ring 74 by the lock balls, while the ring can be shifted only circumferentially, being restrained against axial movement on ring 64 by key means 75, and against traverse movement by its bearing mounts and, in the case of evenly distributed balls, by a complete cancellation of radial forces applied to it by the balls of a set then locked.

However, as already indicated the number of lock balls employed to a set is not a critical factor in the operation of the locking means. Likewise a particular spacing of the balls in each set is not a fundamental consideration to the basic operation of the mechanism, nor is it necessary that an equal number of balls in each set be employed. Nevertheless, preferably a symmetrical arrangement of balls to establish mechanical balance is employed.

Finally, the locking means of the rotational limit coupling mechanism includes separate lock-actuating or control means responsive, whether directly or indirectly, to predetermined rotational displacement from an initial position of flap drive shaft 26, to shift lock control ring 74 in the correct direction and amount, and at the appropriate limit point during rotation of such shaft to reverse the setting of the lock means. In terms of the mechanism thus far described, the function of such control means is to locate ring 74 initially, as when the wing flap controlled by shaft 26 is retracted, in such a rotated position on ball retainer ring 64 that disk 54 is then locked while disk 56, hence slat drive shaft 20, is then free to be rotated by sun gear 50 conjointly with shaft 26. In the numerical example taken for purposes of illustration, when the flap drive shaft 26 is first rotated to commence extending the wing flap of the airplane, slat drive shaft 20 should rotate conjointly with shaft 26 progressively to open the wing slat the full amount during the initial 25 percent of flap extension movement. When that desired limit point of shaft 20 is reached shaft 20 should then be effectively decoupled from shaft 26 and preferably simultaneously locked against any rotation whatever, and thereafter remain locked during the remaining flap extension movement, effected by continued rotation of shaft 26, and also during the initial 75 percent of flap retraction movement from its outer position, effected by reverse rotation of shaft 26. Again upon commencing and during the final 25 percent flap retraction movement ring 74 will be shifted, preferably in reverse direction from previously, the lock hollow shaft 52 and release shaft 20, so that shaft 20 will be rotated back to its initial position by final flap retracting rotation of shaft 26.

The preferred lock actuating control mechanism operation establishing these control points at which to actuate the lock by shifting of control ring 74 includes two freely rotatable gears 78 and 80, the first of which meshes with a gear 82 keyed to shaft 20 and the second of which meshes with a gear 84 splined to hollow shaft 52, to rotate with these shafts, respectively. These gears, journaled in separate ball bearings 86, rotate about a common shaft axis parallel to shaft 20 and have opposing unobstructed faces separated by an opening 88. On the opposing inner faces of these gears are formed the respective cams 79 and 81 of spiral track configuration.

The spiral track of cam 79 is engaged by a cam follower 90 formed as a link or arm having a support end pivotally connected to ears 92 projecting radially from a point on the periphery of outer recessed ring 74. A somewhat similar cam follower 94 pivotally connected to a separate differently located set of ears 96, spaced circumferentially from ears 92 on ring 74, engages the spiral track of cam 81.

As shaft 20 rotates, so does gear 78 and its cam 79, causing cam follower 90 to be transversed by the spiral cam track, incidentally swinging such cam follower about its pivot either inward or outward, depending upon the direction of rotation, with relation to the cam axis. When cam 81 is rotated conjointly with shaft 52, cam follower 94 similarly traverses its cam's track. As will be clearly evident these cams will rotate at different times, as their respective drive shafts, 20 or 52, are rotated in alternate fashion.

The function of these separately operable cams and followers is to shift ring 74 circumferentially in one direction or the other as the terminal outer end of a rotating spiral cam track reaches and presses against the coacting cam follower, thereby to exert a pull on the ring to which such follower is connected. At a different point in the cycle of operation, the ring 74 is shifted oppositely by the terminal outer end of the other spiral cam track reaching the corresponding cam follower to apply reverse force to the ring 74.

In order to accomplish the control function indicated, the circumferential point at which cam follower 90 is pivotally connected to ring 74 is so located, and the cam follower is of such a length between its cam engaging end and its pivotally supported end, that this cam follower, in the illustrated case, will engage cam 79's spiral track near but not necessarily at its terminal inner end when shafts 20 and 26 occupy rotated positions corresponding to the mechanism operating condition wherein the slat is closed and the flap retracted. In this operating position of the cam follower 90, and correspondingly of shafts 20 and 26, outer lock ring 74 will be circumferentially positioned on retainer ring 64 to maintain disk 54, hence shaft 52 and cam 81, locked against rotation, while disk 56, shaft 20, and cam 79 are free to rotate conjointly (Fig. 3). In the illustrated case, the spiral track of cam 79 increases in radius counterclockwise of the cam, using the notation previously adopted.

If, from this position of cam 79 and follower 90, shaft 26 is rotated clockwise, as to extend a wing flap, shaft 20 will likewise be rotated clockwise to extend the wing slat. Driven by gear 82, gear 78 and cam 79 at this time rotate counterclockwise, initiating traversal of cam follower 90 by the cam's spiral track. In the illustrated case the design number of spiral track turns between the initial position of the cam follower thereon, as just described, and the terminal outer end of the track is such that cam follower 90 reaches the outer terminal of the track at the instant shaft 20 completes its full necessary range of rotation to open the wing slat. Thereupon, further or continuing counterclockwise rotation of cam 79 causes it to draw upon and bodily shift the cam follower circumferentially and thereby circumferentially shift lock control ring 74 progressively by continued rotation of cam 79. Such progressive shifting of control ring 74 continues until the set of balls, then locked with disk 54, is released by the corresponding recesses in ring 74 coming into circumferential registry with the ball apertures, at which time disk 54 is released (Fig. 2). Also at the same instant disk 56 is locked by ring 74, nonrecessed areas of which in its instant position block the apertures of those balls which cooperate with disk 56. Lock control ring 74 now remains stationary until later shifted reversely by cam follower 94, as will appear.

During the entire preceding period consumed in opening the slat, and during which cam 79 rotated, hollow shaft 52 had been locked so that cam 81 had remained stationary. During that initial condition of operation of the coupling mechanism, during which cam 81 is stationary, cam follower 94 rests against its cam's spiral track at a point near but not necessarily at its terminal outer end.

However, following the shifting of control ring 74 into its new position of Fig. 2, as shaft 26 progressively extends the airplane wing flap the remaining 75 percent of the desired full amount it is cam 81 which rotates. This it does conjointly with shaft 52, cam follower 94 being traversed by the cam's spiral track. Such flap extension movement is completed without any change in the setting of lock control ring 74, as cam 79 is then stationary and the number of turns of spiral track on cam 81 is greater than necessary to extend between the initial outermost position of the cam follower thereon and its innermost final position on such track, so that the cam follower never quite reaches the terminal inner end of its spiral track on cam 81, even in the most extreme position of rotation of the cam when the wing flap approaches and finally reaches fully extended position. Hence ring 74 is not then shifted circumferentially by cam follower 94. On the contrary, extension movement of the wing flap is limited by other means not herein illustrated and constituting no part of the present invention. Such means might, for example, comprise a limit switch controlling the flap drive motor rotating shaft 12.

However, when shaft 26 is driven in reverse to retract the wing flap, cam 81 does ultimately come into operation to shift lock control ring 74 circumferentially and reverse the lock setting, the point at which this occurs during such reverse shaft rotation, corresponding, in the illustrative case, to the 75 percent-retracted position of the wing flap. By design of cam 81, cam follower 94 engages at such time the terminal outer end of the cam's spiral track (condition shown by Figure 4), so that by continued rotation of the cam beyond the point of first contact between such cam follower and track's end wall the cam follower is jerked and shifted bodily by the cam's continuing rotation, whereby ring 74 is shifted, this time in the reverse direction. Again the shift of such ring progresses until in this instance disk 56 is released by registry of the recesses in ring 74 with the balls cooperating with such disk, and, simultaneously, disk 54 is again locked. Shaft 52 is again locked and shaft 20, released, is rotated in reverse to retract the wing slat by and during the final 25 percent retraction of the flap. During this final 25 percent increment of reverse rotation of cam drive shaft shaft 26, cam 79 again rotates, reversely. Cam follower 90 is traversed by the cam's spiral track until it reaches its initial position thereon located somewhat in advance of the terminal inner end of the track, at which point rotation of the mechanism is stopped by suitable means not illustrated and not a part of the invention. The lock control ring 74 therefore remains unactuated, and it is not again shifted until the flap drive shaft is once more reversed and rotated 25 percent of the number of turns required to extend the wing flap, upon a new cycle of operation.

As will be observed from Figure 4 cam follower 94 is connected to ring 74 at such a point in relation to the cam 81 that, as the follower is engaged by the terminal outer end of the cam's track, the follower arm is generally tangential to both cam 81 and ring 74. Because of this fact and the fact that the moment arm between the cam follower and cam axis is then maximum, ring 74 will be shifted circumferentially by a maximum amount for an additional increment of cam rotation. The switch-over between opposite locking conditions is thereby performed rapidly when the proper point is reached. Cam follower 90 is similarly related to ring 74 and to cam 79, to the same end.

For aircraft use the mechanism housing, as an incidental feature of the illustrated form of the invention, is designed to be sealed off completely so that it might be filled with a light lubricating oil to insure long wear of the various parts of the mechanism. Accordingly, as a part of the retainer assembly 98 for bearing 22, which supports shaft 12, an oil-seal ring 100 is provided to bear against the periphery of shaft 12 and completes the seal of the housing port 14. A similar oil-seal ring 102 forms a part of the retainer assembly 104 which holds bearing 34 in place in the housing adjacent to port 18, surrounding shaft 20. A similar arrangement (not shown) is employed in connection with the shaft leading to the wing flap positioning mechanism, from port 16 (Figure 6).

As will be seen from Figure 1 the housing is made in several parts, parted on lines 106 and 108, for example, for convenience in assembly and disassembly of the mechanism. When the mechanism is first assembled, it is desirable to pack the locking balls 72 retained in the apertures of ring 64, in a heavy grease. One advantage of this is to minimize wear and vibration of the balls caused by the rapid impacts thereon of the ribbed periphery of the rotating disk 54 or 56, the grease tending to hold the balls in the ring recesses at that time once they are forced there initially as the disk first begins to rotate.

During assembly of the mechanism, proper positioning of the cams may be achieved by use of register means, such as slim rods detachably secured to the outer face of each cam and projecting through locating apertures in the housing, such rods being withdrawn after assembly is complete.

Various other details and design considerations will be evident to those skilled in the art, and therefore require no elaboration.

I claim as my invention:

1. In combination a first shaft, a second shaft having an established rotational range, power transfer means having an input element rotated by said second shaft, an output element connected to rotate said first shaft, and selective rotation transmission means connected between said input and output elements and having a rotatable transmission control element operable, when locked against rotation, to condition said transmission means for rotation of said output element by said input element, and, when released for rotation, to interrupt transmission of rotation from said input element to said output element, and means automatically responsive to rotational positioning of said second shaft, and including a lock element cooperating with said selective transmission means control element to lock the same against rotation automatically for all positions of said second shaft throughout a predetermined fractional portion of its rotative range, and further including a separate lock element cooperating with said first shaft and actuated to lock said first shaft against rotation automatically for all positions of said second shaft throughout the complemental portion of its rotative range.

2. Rotational limit shaft coupling mechanism comprising a first and a second shaft, differential gear means having an input rotatable by said second shaft, a first output rotatively connected to said first shaft, and a second output, each such output being rotatable by said input differentially relative to the other output, separate lock means rotatable with each of said outputs, respectively, and lock-actuating means cooperating with said two lock means, and controlled automatically in response to predetermined rotative displacement of said second shaft through a range in one direction to lock said first output lock means against rotation while conjointly releasing said second output lock means, and in response to rotative displacement in the opposite direction of said second shaft back into said range to lock said second output lock means against rotation while releasing the first output lock means.

3. Rotational limit shaft coupling mechanism defined in claim 2 wherein each lock means comprises an abutment element rotatable conjointly with the corresponding differential output, a displaceable element guided for movement generally at right angles to the rotative path of said abutment element, and held against movement generally parallel to such path, such displaceable element being normally displaceable from the path of the abutment element by the latter in rotating past it, and control means cooperating with the displaceable elements of the two lock means, movable between one control position restraining said normal displacement of the displaceable elements of only one of said lock means, thereby to restrain rotation of the corresponding abutment element and differential output, and an alternate control position similarly restraining such normal displacement of the displaceable element of the other lock means correspondingly to restrain rotation of the abutment element and differential output cooperating with the latter lock means, the lock-actuating means effecting movement of said control means between such control positions.

4. Rotational limit shaft coupling mechanism defined in claim 3, wherein the lock-actuating means comprises cam means rotatable conjointly with the second shaft, and cam follower means engaged with said cam means and operatively connected to the displaceable element control means to move the latter between its control positions automatically in response to rotation of the second shaft.

5. Rotational limit shaft coupling mechanism defined in claim 3, wherein the abutment element comprises a rotative disk-like member having an annular surface contoured to form an abutment thereon, and the displaceable element comprises a ball engageable with such abutment, such mechanism further including a ball retainer member having therein a ball retaining aperture extending generally normal to said annular surface to guide such ball for displacement into and out of blocking engagement with said abutment, the displaceable element control means comprising a recessed member disposed adjacent to said retainer member and having a blocking surface which in one control position of such recessed member covers the ball retainer aperture to prevent ball displacement through said aperture by said abutment engaging the ball, and further having therein a recess which in an alternate control position of said recessed member lies in registry with and opens into said ball retainer aperture to receive the ball and thereby permit such ball displacement, and means guiding said recessed member for shifting between said control positions.

6. Rotational limit shaft coupling mechanism defined in claim 4, wherein the differential gear means comprises an epicyclic gear train whose input comprises a ring gear, whose first output comprises a sun gear, which gear train includes a planetary gear meshed with said ring gear and sun gear, and whose second output comprises a rotative spider carrying said planetary gear for orbital movement about the sun gear's axis, the first shaft carrying said sun gear for conjoint rotation therewith, and said spider having a hub projecting axially therefrom and encircling said first shaft, and wherein the separate lock means each includes a disk-like element mounted for rotation on the first shaft and the spider hub, respectively, for conjoint rotation with such shaft and hub, and means controlled by the lock actuating means to restrain selectively rotation of either of said disk-like elements.

7. Rotational limit shaft coupling mechanism defined in claim 6, wherein the respective peripheries of the disk-like elements each carry an abutment, and the means controlled by the lock actuating means to lock the disk-like elements against rotation comprises a fixed ball retainer ring encircling both of the disk-like elements, and having therein radial ball-receiving apertures aligned with the planes of rotation of the respective abutment elements, a ball received in each such aperture and guided for radial movement therein into and from interfering position relative to an abutment element, and an internally recessed outer ring having ball receiving recesses and intermediate aperture blocking surfaces, closely encircling said ball retainer ring and guided for shifting circumferentially relative thereto, said ring being interconnected with the lock-actuating means to be shifted circumferentially thereby between one circumferential control position in which its blocking surface covers the outer end of a ball retainer aperture corresponding to one abutment element to restrain its ball against outward displacement from the rotative path of such abutment element, so as to restrain the latter against rotation, and an alternate circumferential control position with its internal recess disposed in registry with such ball aperture to permit such ball displacement and thereby permit rotation of said latter abutment element unrestrained by such ball, while simultaneously, through similar recess registry and blocking action by the outer ring of a ball aperture cooperating with the abutment of the other disk-like element, to release and restrain the latter alternately and oppositely from the first disk-like element, in the respective control positions of the outer ring.

8. Mechanism comprising first and second rotative members, rotational drive means cooperating with said members and operable to rotate the same differentially so that when either one is stopped the other will be rotated by said drive means, lock means having separate lock elements rotatable conjointly with said rotative members, respectively, and also having a lock control member cooperating with said lock elements and movable into one control position of engagement with said lock elements to stop rotation of one of said lock elements while releasing the other lock element, and into a second control position to release the first lock element while stopping the second lock element from rotating, and a first rotational limit governing member rotatable conjointly with said first rotative member, a second rotational limit governing member rotatable conjointly with said second rotative member, and separate lock-control-member actuating means operatively interconnecting said respective governing members and said lock control member to move the latter into one control position by predetermined rotational displacement of one of said governing members from a reference position through a range of rotation of said drive means in one direction, thereby to stop rotation of one lock element while releasing the other lock element, and to move the control member into its other control position to stop rotation of the other lock element and release the first lock element by predetermined rotational placement of the other governing member upon reverse rotation of said drive means back into said range, thereby alternately to lock and release one or the other of said rotative members by movement of said drive means beyond and back into said range, respectively.

9. Mechanism defined in claim 8, wherein the rotational limit governing members comprise cams, each having a spiral track of predetermined angular length, and the separate actuating means comprise separate cam followers engaging the respective cam tracks, one operable to shift the lock control member into one control position and the other operable to shift such lock control member into its other control position by such cam followers engaging the ends of their respective cam tracks during cam rotation.

10. Rotational limit shaft coupling mechanism comprising differential transmission means having a rotatable input, and having two outputs differentially rotatable, and differential-output selective locking means operable to lock against rotation and release separately said two differential outputs in alternate fashion, said locking means including separate lock elements rotatable, respectively, each with one of said differential outputs, said selective locking means further including lock control means cooperating with said lock elements and having a first position of engagement therewith to restrain against rotation one such element while releasing the other, and an alternate similar control position to restrain against rotation the other lock element while releasing the first, and means cooperating with said input and connected to said lock control means to shift the same between its control positions, in such manner as to engage and restrain against rotation one of said lock elements while conjointly releasing the other automatically in response to rotation of said input in one direction through a range and past a selected control position, and reversely to engage and restrain against rotation the other of said lock elements while releasing the first thereof automatically in response to rotation of said input in the opposite direction past such control position and back into said range.

11. Rotational limit coupling mechanism, comprising differential transmission means having an input, and having two outputs differentially rotatable, and differential-output control means operable to lock against rotation and release separately said two differential outputs in alternate fashion, said control means including separate lock elements, each being conjointly rotatable with a different one of said differential outputs, and each operable separately to lock its output, lock element restraining means selectively engageable with said lock elements in a manner to restrain rotation thereof one at a time, means guiding said lock element restraining means for shifting relative to said lock elements from a position restraining rotation of one of said lock elements to a position restraining rotation of the other of said lock elements, and input rotation-responsive means operable to move said lock element restraining means from one such position to the other automatically by rotation of said input in one direction past a selected control position.

ROY H. ANDERSON.

REFERENCES CITED

The following references are of record in the file of this patent:

UNITED STATES PATENTS

| Number | Name | Date |
|---|---|---|
| 1,800,746 | Page | Apr. 14, 1931 |
| 2,403,102 | Plotkin | July 2, 1946 |
| 2,422,296 | Flader et al. | June 17, 1947 |